(12) United States Patent
Jeong et al.

(10) Patent No.: US 8,558,503 B2
(45) Date of Patent: Oct. 15, 2013

(54) CHARGING DEVICE FOR PORTABLE TERMINAL

(75) Inventors: Chang-Hoon Jeong, Gunpo-si (KR); Jong-Hyun Lee, Hwaseong-si (KR); Chul-Kwi Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 13/099,706

(22) Filed: May 3, 2011

(65) Prior Publication Data

US 2011/0304300 A1 Dec. 15, 2011

(30) Foreign Application Priority Data

Jun. 11, 2010 (KR) ........................ 10-2010-0055583

(51) Int. Cl.
*H02J 7/00* (2006.01)
*H01R 13/44* (2006.01)
*H01R 13/66* (2006.01)

(52) U.S. Cl.
USPC ........... 320/107; 320/113; 320/115; 439/131; 439/151

(58) Field of Classification Search
USPC .................. 320/107, 113, 115; 439/131, 151
See application file for complete search history.

(56) References Cited

U.S. PATENT DOCUMENTS

| | | | |
|---|---|---|---|
| 4,794,315 A * | 12/1988 | Pederson et al. | 320/111 |
| 5,435,748 A * | 7/1995 | Abe | 439/489 |
| 5,973,948 A | 10/1999 | Hahn et al. | |
| 6,320,353 B1 | 11/2001 | Chiu et al. | |
| 7,285,934 B2 * | 10/2007 | Chang | 320/107 |
| 7,638,968 B2 * | 12/2009 | Inoue et al. | 320/107 |
| 7,923,964 B2 * | 4/2011 | Lin et al. | 320/115 |
| 2005/0269987 A1 * | 12/2005 | Lin | 320/115 |
| 2006/0202660 A1 * | 9/2006 | Chang | 320/115 |
| 2007/0047182 A1 | 3/2007 | Hassend et al. | |
| 2007/0105432 A1 * | 5/2007 | Muhs et al. | 439/492 |
| 2009/0058356 A1 * | 3/2009 | Lee et al. | 320/106 |
| 2009/0149077 A1 * | 6/2009 | Trimborn et al. | 439/660 |
| 2010/0062652 A1 | 3/2010 | Liu | |
| 2010/0117598 A1 * | 5/2010 | Lin et al. | 320/115 |

FOREIGN PATENT DOCUMENTS

| | | |
|---|---|---|
| CH | 695 970 A5 | 10/2006 |
| DE | 101 03 679 A1 | 8/2002 |
| WO | 2008/110043 A1 | 9/2008 |

* cited by examiner

*Primary Examiner* — M'Baye Diao
(74) *Attorney, Agent, or Firm* — Jefferson IP Law, LLP

(57) ABSTRACT

A charging cradle for mounting a portable terminal or a battery pack for the portable terminal, a multi-plug adapted to be mounted by being inserted into the charging cradle, hook holes formed in the charging cradle, and hooks adapted to be engaged with the hook holes, wherein the direction for inserting the multi-plug into the charging cradle and the direction for connecting the multi-plug to an external receptacle are perpendicular to each other, is provided, so that charging cradles adapted to be commonly used worldwide, and by localizing multi-plugs by countries or cities, i.e., by providing each country or city with multi-plugs adapted to be suitably used in such a country or a city, enable a user to use his or her charging device by only buying a multi-plug available in a country or a city where the user stays if it is desired.

9 Claims, 2 Drawing Sheets

CHARGING DEVICE FOR PORTABLE TERMINAL

PRIORITY

This application claims the benefit under 35 U.S.C. §119 (a) of a Korean patent application filed in the Korean Intellectual Property Office on Jun. 11, 2010 and assigned Serial No. 10-2010-0055583, the entire disclosure of which is hereby incorporated by reference.

BACKGROUND OF THE INVENTION

1. Field of the Invention

The present invention relates to a portable terminal, such as a mobile communication terminal. More particularly, the present invention relates to a Personal Digital Assistance (PDA), an electronic diary, and a portable multimedia player, and more particularly, to a charging device for such a portable terminal.

2. Description of the Related Art

In addition to a communication function, such as a voice call or a short message transmission, portable terminals support a multimedia function, such as music or a moving image reproduction, an electronic diary function, such as daily schedule management, or a dictionary, and the like. Recently, with the increased development of information, communication, and semiconductor technologies, the use of portable terminals having various advanced functions is rapidly increasing. For example, recent portable terminals additionally support a business function, such as documentation or a presentation, and its functions are extended to various fields from an entertainment function, such as a game, to a sharing function, such as a Social Network Service (SNS).

Since such portable terminals need to be capable of functioning while in motion, they are provided with a chargeable battery pack for supplying power. It is inevitable for a user to periodically charge the battery pack, and in order to use the portable terminal even during long distance travel or business trip, the user needs to carry a separate charging device for charging the battery pack.

As the use of portable terminals is popularized worldwide, portable terminals may have specifications which are different from country to country, from manufacturer to manufacturer, and from one telecommunication company to another. As a result, efforts are being made for standardizing some components, such as charging terminals, that are essentially required for portable terminals. This can provide advantages in that users' convenience can be improved by allowing the users to charge their portable terminals everywhere, and manufacturers can save manufacturing costs as charging devices become commonly used.

There are some difficulties in commonly using charging devices since power supply methods, more particularly, receptacle-plug standards, are different from country to country or from city to city.

Therefore, a need exists for a charging device which can obviate the inconvenience of charging caused due to power supply methods which are different from country to country or from city to city by providing a charging cradle and a multi-plug in a separable type.

SUMMARY OF THE INVENTION

Aspects of the present invention are to address at least the above-mentioned problems and/or disadvantages and to provide at least the advantages described below. Accordingly, an aspect of the present invention is to provide a charging device which can obviate the inconvenience of charging caused due to power supply methods which are different from country to country or from city to city by providing a charging cradle and a multi-plug in a separable type.

Another aspect of the present invention is to provide a charging device for a portable terminal, which is provided with a stable engagement structure between a charging cradle and a multi-plug.

Still another aspect of the present invention is to provide a charging device for a portable terminal, which is electrically stabilized regardless of a city or a country for using it.

In accordance with an aspect of the present invention, a charging device for a portable terminal is provided. The charging device includes a charging cradle for mounting the portable terminal or a battery pack for the portable terminal, a multi-plug adapted to be mounted on the charging cradle by being inserted into the charging cradle, hook holes formed in the charging cradle, and hooks provided to the multi-plug to be engaged with the hook holes, wherein the direction for inserting the multi-plug into the charging cradle and the direction for connecting the multi-plug to an external receptacle are perpendicular to each other.

Here, the charging cradle may have a coupling recess, which is opened in front and top sides, so that the multi-plug can be inserted into the coupling recess, and a power source connection hole concavely formed in the forward facing inner wall of the coupling recess, wherein the hook holes are formed on two opposing inner walls of the coupling recess.

In addition, the charging cradle may have a cradling recess, in which the terminal or the battery pack of the terminal is mounted.

In addition, the multi-plug may include a body adapted to be inserted into the coupling recess, and a receptacle connection body extending from a face of the body, wherein the hooks are provided on two opposing sides of the body of the multi-plug.

If the charging cradle has the coupling recess, and the power source connection hole, the multi-plug includes a body adapted to be inserted into the coupling recess, a receptacle connection body extending from a face of the body, and a cradle connection body formed on a first side of the body adjacent to the face of the body of the multi-plug, and adapted to be inserted into the power source connection hole, wherein the hooks are provided on two opposing sides of the body of the multi-plug.

In addition, the hooks are adapted to be connected to a ground provided in the circuit of the charging cradle, and to connect the ground of the circuit to a ground part of the external receptacle when the multi-plug is coupled to an external receptacle.

In accordance with another aspect of the present invention, by producing charging cradles adapted to be commonly used worldwide, and by localizing multi-plugs by countries or cities, i.e., by providing each country or city with multi-plugs adapted to be suitably used in such a country or a city, a user can use his or her charging device by only buying a multi-plug available in a country or a city where the user stays, if it is desired. In addition, since the multi-plug is adapted to be inserted in a direction perpendicular to a direction for connecting the multi-plug into an external receptacle when mounting the multi-plug on the charging cradle, it is possible to prevent the multi-plug from being separated from the charging cradle when the multi-plug is engaged with or disengaged from the external receptacle. Moreover, since hooks for binding the multi-plug to the charging cradle are connected to a ground provided in the circuit of the charging cradle, and the multi-plug is provided with a ground means to an external receptacle, the charging device can be electronically stabilized.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
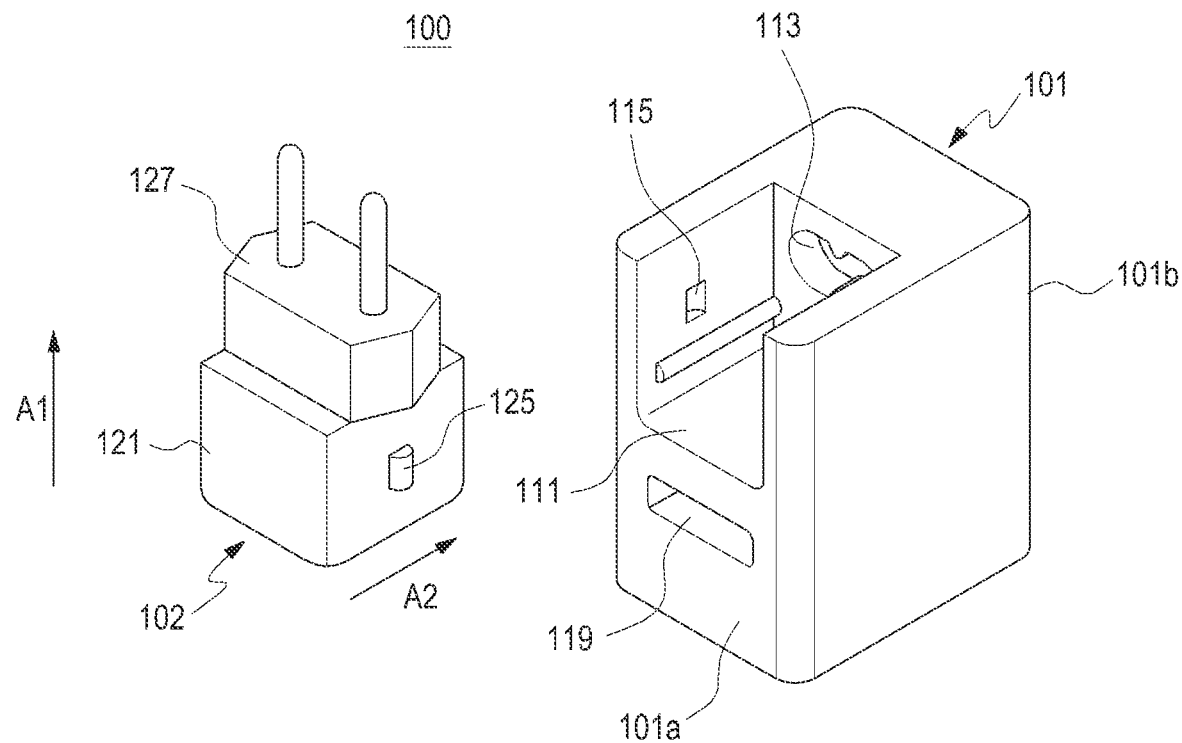
FIG. 1 is a perspective view of a charging device for a portable terminal in accordance with an exemplary embodiment of the present invention.
Figure 2:
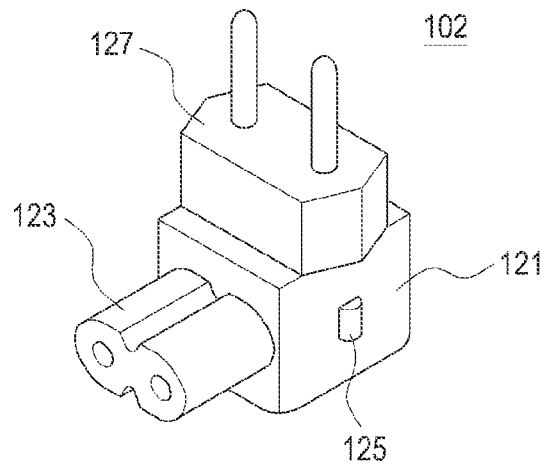
FIG. 2 is a perspective view of a multi-plug of a charging device in accordance with an exemplary embodiment of the present invention.
Figure 3:
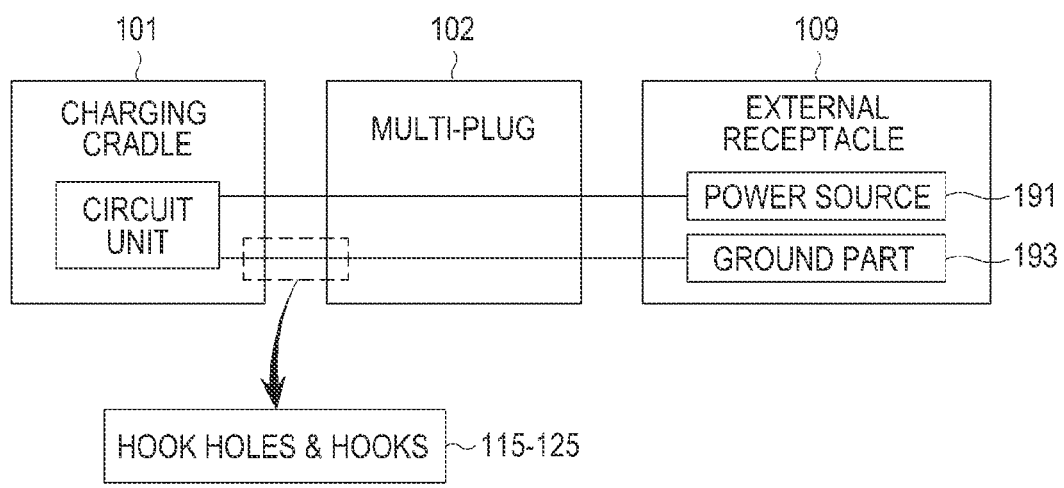
FIG. 3 illustrates a connection configuration of a charging device in accordance with an exemplary embodiment of the present invention.

FIGS. 1 through 3, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a perspective view of a charging device for a portable terminal in accordance with an exemplary embodiment of the present invention.

Referring to FIG. 1, a charging device 100 for a portable terminal includes a charging cradle 101, a multi-plug 102, hook holes 115 and hooks 125 for binding the charging cradle 101 and the multi-plug 102, wherein the direction for connecting the multi-plug 102 to the charging cradle 101, A2, is perpendicular to the direction for connecting the multi-plug 102 to an external receptacle, A1.

The charging cradle 101 has a cradle recess 119 for cradling a portable terminal or a battery pack for such a portable terminal, wherein the cradle recess 119 may be formed in any of the front side 101a, the lateral sides, and the rear side 101b. If the charging cradle 101 is connected to the external receptacle through the multi-plug 102, and the terminal or battery pack is mounted in the cradle recess 119, charging is conducted for a predefined length of time.

In order to mount the multi-plug 102, the charging cradle 101 has a coupling recess 111. The coupling recess 111 is opened in the front side 101a and the top side of the charging cradle 101, and has a first inner wall facing toward the front side 101a of the charging cradle 101, a bottom wall facing toward the top side of the charging cradle 101, and a pair of opposite side walls.

On the first inner wall of the coupling recess 111, there is formed a power connection hole 113, which is adapted to be connected with the multi-plug 102. The power source connection hole 113 is adapted to provide a power source of a circuit incorporated in the charging cradle 101, wherein the power source connection hole 113 is engaged with a cradle connection body 123 to be described later. In addition, the opposite side walls of the coupling recess 111 are formed with hook holes 115. The hook holes 115 are formed to be engaged with the hooks 125 of the multi-plug 102, so as to bind the charging cradle 101 and the multi-plug 102.

FIG. 2 is a perspective view of a multi-plug of a charging device in accordance with an exemplary embodiment of the present invention.

Referring to FIG. 2, a multi-plug 102 has a body 121 which is inserted into the charging cradle 101, more particularly, into the coupling recess 111. A receptacle connection body 127 extends from one face of the body 121, wherein the receptacle connection body 127 is adapted to be connected to an external receptacle. A cradle connection body 123 is formed on a first side adjacent to the face of the body 121, wherein the cradle connection body 123 is adapted to be inserted in the power source connection hole 113. The receptacle connection body 127 and the cradle connection body 123 are electrically connected with each other, so as to transfer power supplied from the external receptacle to the charging cradle 101.

Meanwhile, the hooks 125 to be engaged with the hook holes 115 of the charging cradle 101 are provided on the multi-plug 102, more particularly, on two opposing sides of the body 121 of the multi-plug 102, which are adjacent to the top side and the first side of the multi-plug 102.

While the multi-plug 102 is being inserted into the charging cradle 101, the hooks 125 may create friction against the inner walls of the coupling recess 11, and if the receptacle connection body 123 is completely fitted in the power source connection hole 113, the hooks 125 are engaged with the hook holes 115.

The hooks 125 may be formed from leaf springs, and may be arranged to protrude in a curved shape from the body 121. It is desired to design the curved shape of each of the hooks 125 in such a manner that during the insertion of the body 121 into the coupling recess 111, as shown in FIG. 1, the hooks 125 create friction against the inner walls of the coupling recess 111 while allowing the body 121 to be smoothly moved forward in the direction A2 for inserting the body 121 into the coupling recess 111, and when the hooks 125 are coupled to the hook holes 115, the hooks 125 restrain the movement of the body 121 in the direction A1 for inserting the body 121 into the external receptacle.

Like a ground means provided in a circular receptacle mounted on a wall of a home, the external receptacle for providing power of household electric appliances may be provided with a ground means for preventing electric leakage from an appliance connected to the external receptacle. The charging device 100 may also connect the ground of the circuit incorporated in the charging device 101 to the conventional ground means of the external receptacle.

This can be achieved by connecting the hooks 125 to the ground of the circuit incorporated in the charging cradle 101, mounting a ground terminal (not shown) on the receptacle connection body 127, and electrically connecting the ground terminal to the hooks 125. Such a ground terminal is connected to a ground pin of an external terminal when the receptacle connection body 127 is coupled to the external receptacle. Through this, the ground of the circuit incorporated in the charging cradle 101 is grounded to the outside, so that the charging device can be electrically stabilized.

FIG. 3 illustrates a connection configuration of a charging device in accordance with an exemplary embodiment of the present invention.

Referring to FIG. 3, a charging cradle 101 is connected to a power source 191 of an external receptacle 109 through a multi-plug 102, thereby receiving power. In addition, the ground means provided in the circuit of the charging cradle 101 is electrically grounded to a ground part 193 of the external receptacle 109 through the hook holes 115, the hooks 125 and a ground terminal (not shown), whereby the charging device 100 can be electrically stabilized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A charging device for a portable terminal, the charging device comprising:
    a charging cradle for mounting the portable terminal or a battery pack for the portable terminal;
    a multi-plug adapted to be mounted on the charging cradle by being inserted into the charging cradle;
    hook holes formed in the charging cradle; and
    hooks provided to the multi-plug to be engaged with the hook holes,
    wherein the direction for inserting the multi-plug into the charging cradle and the direction for connecting the multi-plug to an external receptacle are perpendicular to each other.

2. The charging device as claimed in claim 1, wherein the charging cradle comprises:
    a coupling recess, which is opened in front and top sides, so that the multi-plug can be inserted into the coupling recess; and
    a power source connection hole concavely formed in the forward facing inner wall of the coupling recess, wherein the hook holes are formed on two opposing inner walls of the coupling recess.

3. The charging device as claimed in claim 1, wherein the charging cradle comprises a cradling recess, in which the terminal or the battery pack of the terminal is mounted.

4. The charging device as claimed in claim 1, wherein the multi-plug comprises:
    a body adapted to be inserted into the charging cradle; and
    a receptacle connection body extending from a face of the body, wherein the hooks are provided on two opposite sides of the body of the multi-plug.

5. The charging device as claimed in claim 2, wherein the multi-plug comprises:
    a body adapted to be inserted into the coupling recess;
    a receptacle connection body extending from a face of the body; and
    a cradle connection body formed on a first side of the body adjacent to the face of the body of the multi-plug, and adapted to be inserted into the power source connection hole, wherein the hooks are provided on two opposing sides of the body of the multi-plug.

6. The charging device as claimed in claim 1, wherein the hooks are adapted to be connected to a ground provided in the circuit of the charging cradle and further adapted to connect the ground of the circuit to a ground part of the external receptacle when the multi-plug is coupled to an external receptacle.

7. The charging device as claimed in claim 2, wherein the charging cradle comprises a cradling recess, in which the terminal or the battery pack of the terminal is mounted.

8. The charging device as claimed in claim 2, wherein the multi-plug comprises:
    a body adapted to be inserted into the charging cradle; and
    a receptacle connection body extending from a face of the body, wherein the hooks are provided on two opposite sides of the body of the multi-plug.

9. The charging device as claimed in claim 8, wherein the hooks are formed from leaf springs and arranged to protrude in a curved shape from the body, wherein during the insertion of the body into the coupling recess, the hooks create friction against the inner walls of the coupling recess while allowing the body to be smoothly moved forward, and when the hooks are coupled to the hook holes, the hooks restrain the backward movement of the body for inserting the body into the external receptacle.

* * * * *